(12) United States Patent
Jankovic et al.

(10) Patent No.: US 11,673,548 B2
(45) Date of Patent: Jun. 13, 2023

(54) VEHICLE DETECTION AND RESPONSE

(71) Applicant: Ford Global Technologies, LLC, Dearborn, MI (US)

(72) Inventors: Mrdjan J. Jankovic, Birmingham, MI (US); Yousaf Rahman, Ypsilanti, MI (US); Mario A. Santillo, Canton, MI (US); Abhishek Sharma, Ann Arbor, MI (US); Michael Hafner, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 315 days.

(21) Appl. No.: 17/017,003

(22) Filed: Sep. 10, 2020

(65) Prior Publication Data
US 2022/0073063 A1    Mar. 10, 2022

(51) Int. Cl.
*B60W 30/09* (2012.01)
*B60W 30/095* (2012.01)
*G05D 1/02* (2020.01)

(52) U.S. Cl.
CPC ........ *B60W 30/0956* (2013.01); *B60W 30/09* (2013.01); *G05D 1/0212* (2013.01); *B60W 2510/06* (2013.01); *B60W 2510/18* (2013.01); *B60W 2510/20* (2013.01); *B60W 2552/53* (2020.02); *B60W 2554/801* (2020.02)

(58) Field of Classification Search
CPC ................... B60W 30/09–0956; G05D 1/0212
See application file for complete search history.

(56) References Cited

U.S. PATENT DOCUMENTS 8,903,588 B2    12/2014   Schmudderich et al.
10,093,315 B2   10/2018   Nath et al.
10,377,376 B2    8/2019   Diedrich et al.
(Continued)

FOREIGN PATENT DOCUMENTS

EP    3360747 A1 *   8/2018   ............ B60W 30/18

OTHER PUBLICATIONS

Althoff et al, "Model-Based Probabilistic Collision Detection in Autonomous Driving", IEEE Transactions on Intelligent Transportation Systems · Jul. 2009, DOI: 10.1109/TITS.2009.2018966 Source: IEEE Xplore.
(Continued)

*Primary Examiner* — Calvin Cheung
(74) *Attorney, Agent, or Firm* — Frank A. MacKenzie; Bejin Bieneman PLC

(57) ABSTRACT

A computer includes a processor and a memory storing instructions executable by the processor to identify a virtual boundary between a host roadway lane of a host vehicle and a target roadway lane of a target vehicle, the virtual boundary based on a predicted path of the target vehicle, determine a first constraint value based on a boundary approach velocity of the target vehicle, determine a second constraint value based on (1) a boundary approach velocity of the host vehicle and (2) a boundary approach acceleration of the host vehicle and perform a threat assessment of a collision between the host vehicle and the target vehicle upon determining that the first constraint value violates a first threshold or the second constraint value violates a second threshold.

19 Claims, 3 Drawing Sheets

(56) References Cited

U.S. PATENT DOCUMENTS

| | | | |
|---|---|---|---|
| 2004/0193347 A1* | 9/2004 | Harumoto | G08G 1/16 |
| | | | 701/45 |
| 2012/0101711 A1 | 4/2012 | Furmston et al. | |
| 2017/0120908 A1* | 5/2017 | On | B60W 50/082 |
| 2018/0120859 A1* | 5/2018 | Eagelberg | G01C 21/34 |
| 2018/0345978 A1* | 12/2018 | Fujii | B60W 30/18163 |
| 2019/0220030 A1* | 7/2019 | Ohmura | B60W 30/0953 |
| 2019/0266418 A1* | 8/2019 | Xu | G05D 1/0221 |
| 2020/0180634 A1* | 6/2020 | Hammoud | G05D 1/0088 |
| 2020/0339157 A1* | 10/2020 | Yurdana | B60K 35/00 |
| 2021/0070288 A1* | 3/2021 | Yamaoka | B60W 30/09 |

OTHER PUBLICATIONS

Ames et al., "Control Barrier Function Based Quadratic Programs for Safety Critical Systems", IEEE Transactions on Automatic Control, vol. 62, No. 8, Aug. 2017.

Gat et al., "A Monocular Vision Advance Warning System for the Automotive Aftermarket", Paper Offer #: 05AE-104 Session: AE7, https://www.researchgate.net/publication/228542522, DOI: 10.4271/2005-01-1470.

Laugier et al., "Probabilistic Analysis of Dynamic Scenes and Collision Risk Assessment to Improve Driving Safety", Its Journal, Informa UK (Taylor & Francis), 2011, 3(4), pp. 4-19. 10.1109/MITS.2011.942779. https://hal.inria.fr/hal-00645046.

Xu, "Constrained control of input-output linearizable systems using control sharing barrier functions", Abstract Only, https://www.sciencedirect.com/science/article/pii/S0005109817305046.

\* cited by examiner

VEHICLE DETECTION AND RESPONSE

BACKGROUND

A vehicle can use sensors to detect an object on a roadway. Host vehicle sensors can detect a position and speed of the object, e.g., a vehicle of interest, sometimes referred to as a target vehicle, relative to the host vehicle. For example, host vehicle sensors can detect the position of the target relative to the vehicle. The vehicle can respond to detecting the target, e.g., by steering away from the target, by braking prior to reaching the target, etc.

DETAILED DESCRIPTION

Figure 1:
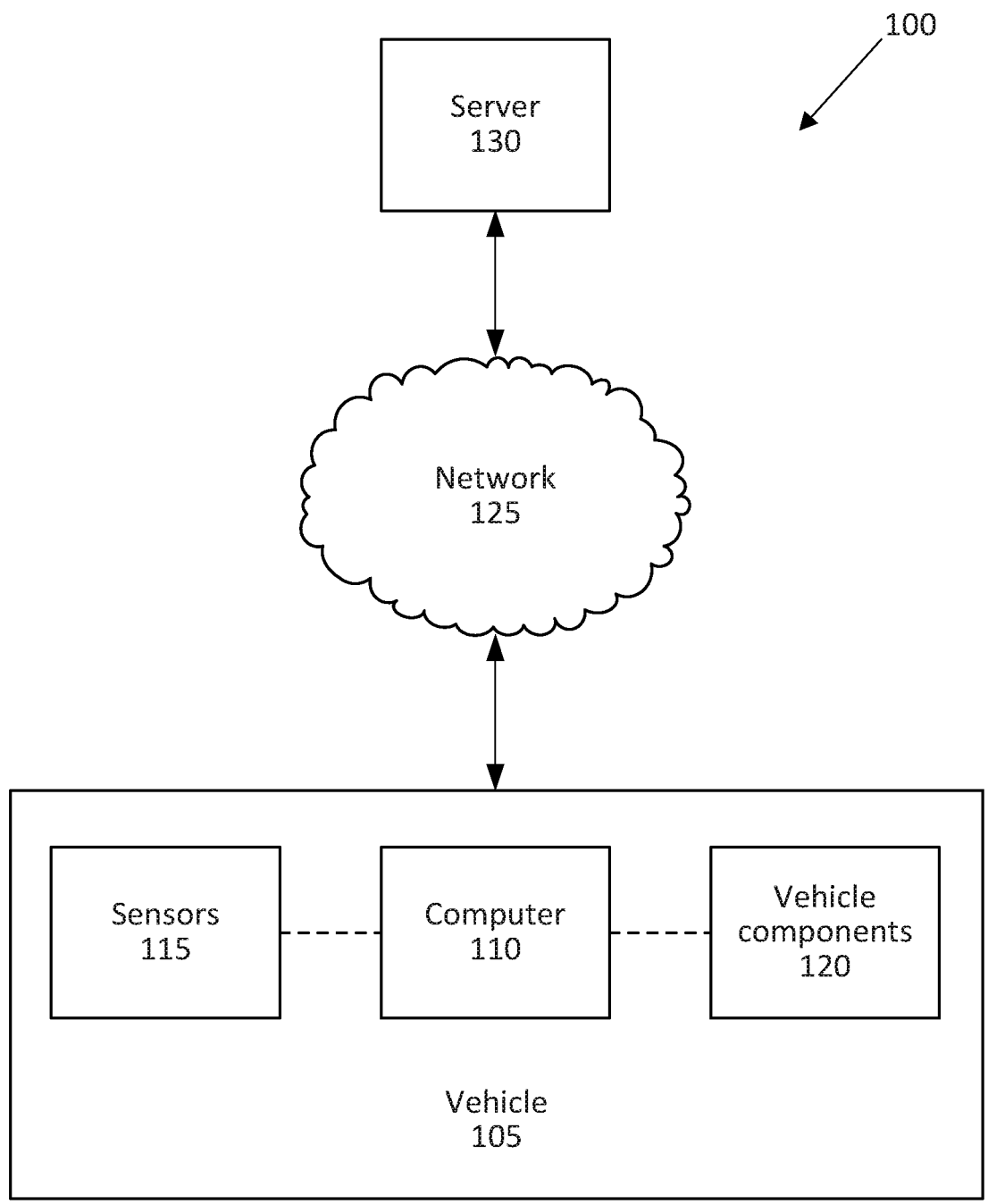
FIG. 1 is a diagram of an example system for operating a vehicle.

A system includes a computer including a processor and a memory, the memory storing instructions executable by the processor to identify a virtual boundary between a host roadway lane of a host vehicle and a target roadway lane of a target vehicle, the virtual boundary based on a predicted path of the target vehicle, determine a first constraint value based on a boundary approach velocity of the target vehicle, determine a second constraint value based on (1) a boundary approach velocity of the host vehicle and (2) a boundary approach acceleration of the host vehicle, and perform a threat assessment of a collision between the host vehicle and the target vehicle upon determining that the first constraint value violates a first threshold or the second constraint value violates a second threshold.

The instructions can further include instructions to actuate one or more vehicle components to avoid the target vehicle based on the threat assessment.

The instructions can further include instructions to, upon performing the threat assessment, identify a third constraint value based on a location of the target vehicle and to actuate one or more components when the third constraint value violates a third threshold.

The instructions can further include instructions to determine the second constraint value based on a predicted lateral distance from the target vehicle to the virtual boundary.

The instructions can further include instructions to input the lateral position of the target vehicle to a path planning algorithm to predict the lateral distance.

The instructions can further include instructions to determine that the first constraint value violates the first threshold based on a sign of the first constraint value.

The instructions can further include instructions to determine that the second constraint value violates the second threshold when the target vehicle crosses the virtual boundary.

The instructions can further include instructions to determine the second constraint value on a boundary approach acceleration of the target vehicle.

The instructions can further include instructions to determine the boundary approach acceleration of the host vehicle based on a steering input, a brake input, and a throttle input to the host vehicle.

The instructions can further include instructions to perform the threat assessment upon detecting the target vehicle in the host roadway lane.

A method includes identifying a virtual boundary between a host roadway lane of a host vehicle and a target roadway lane of a target vehicle, the virtual boundary based on a predicted path of the target vehicle, determining a first constraint value based on a boundary approach velocity of the target vehicle, determining a second constraint value based on (1) a boundary approach velocity of the host vehicle and (2) a boundary approach acceleration of the host vehicle, and performing a threat assessment of a collision between the host vehicle and the target vehicle upon determining that the first constraint value violates a first threshold or the second constraint value violates a second threshold.

The method can further include actuating one or more vehicle components to avoid the target vehicle based on the threat assessment.

The method can further include, upon performing the threat assessment, identifying a third constraint value based on a location of the target vehicle and actuating one or more components when the third constraint value violates a third threshold.

The method can further include determining the second constraint value based on a predicted lateral distance from the target vehicle to the virtual boundary.

The method can further include inputting the lateral position of the target vehicle to a path planning algorithm to predict the lateral distance.

The method can further include determining that the first constraint value violates the first threshold based on a sign of the first constraint value.

The method can further include determining that the second constraint value violates the second threshold when the target vehicle crosses the virtual boundary.

The method can further include determining the second constraint value on a boundary approach acceleration of the target vehicle.

The method can further include determining the boundary approach acceleration of the host vehicle based on a steering input, a brake input, and a throttle input to the host vehicle.

The method can further include performing the threat assessment upon detecting the target vehicle in the host roadway lane.

A system includes a plurality of vehicle components including a brake, a propulsion, and a steering assembly, means for identifying a virtual boundary between a host roadway lane of a host vehicle and a target roadway lane of a target vehicle, the virtual boundary based on a predicted path of the target vehicle, means for determining a first constraint value based on a boundary approach velocity of the target vehicle, means for determining a second constraint value based on (1) a boundary approach velocity of the host vehicle and (2) a boundary approach acceleration of the host vehicle, means for performing a threat assessment of a collision between the host vehicle and the target vehicle upon determining that the first constraint value violates a first threshold or the second constraint value violates a second threshold, and means for actuating one or more of the plurality of vehicle components to avoid the target vehicle based on the threat assessment.

The system can further include means for identifying a third constraint value based on a location of the target vehicle upon performing the threat assessment and means for actuating one or more components when the third constraint value violates a third threshold.

The system can further include means for determining the second constraint value based on a predicted lateral distance from the target vehicle to the virtual boundary.

The system can further include means for determining the boundary approach acceleration of the host vehicle based on a steering input, a brake input, and a throttle input to the host vehicle.

The system can further include means for performing the threat assessment upon detecting the target vehicle in the host roadway lane.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Collision avoidance with a target vehicle with virtual boundaries allows a host vehicle to predict an intent, i.e., a future path or motion, of the target vehicle. The host vehicle can identify one or more constraint values representing motion of the target vehicle. The constraint values are based on velocity and acceleration at which the target vehicle approaches the virtual boundaries and with other factors as discussed below, e.g., target vehicle heading angle and steering angle. When one or more of the constraint values violate respective thresholds, the host vehicle can perform a threat assessment to determine a probability of a collision with the target vehicle. The host vehicle can, based on the threat assessment, actuate one or more components to avoid the target vehicle. The virtual boundaries, boundary approach velocity, and boundary approach acceleration allow the host vehicle to predict the target vehicle movement with less data and fewer computations than other techniques that could be employed, e.g., a neural network or machine learning program. Using the boundary approach velocity and the boundary approach acceleration can allow the host vehicle to avoid a collision with the target vehicle crossing one of the virtual boundaries and to adjust operation of one or more components prior to the host vehicle reaching the virtual boundaries.

FIG. 1 illustrates an example system 100 for operating a vehicle 105. A computer 110 in the vehicle 105 is programmed to receive collected data from one or more sensors 115. For example, vehicle data may include a location of the vehicle 105, data about an environment around a vehicle, data about an object outside the vehicle such as another vehicle, etc. A vehicle location is typically provided in a conventional form, e.g., geo-coordinates such as latitude and longitude coordinates obtained via a navigation system that uses the Global Positioning System (GPS). Further examples of data can include measurements of vehicle systems and components, e.g., a vehicle velocity, a vehicle trajectory, etc.

The computer 110 is generally programmed for communications on a vehicle network, e.g., including a conventional vehicle communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering assembly (e.g., that may include one or more of a steering wheel, a steering rack, etc.), a brake component, a park assist component, an adaptive cruise control component, an adaptive steering component, a movable seat, and the like.

Components 120 can include computing devices, e.g., electronic control units (ECUs) or the like and/or computing devices such as described above with respect to the computer 110, and that likewise communicate via a vehicle network.

A vehicle 105 can operate in one of a fully autonomous mode, a semiautonomous mode, or a non-autonomous mode. A fully autonomous mode is defined as one in which each of vehicle propulsion (typically via a powertrain including an electric motor and/or internal combustion engine), braking, and steering are controlled by the computer 110. A semi-autonomous mode is one in which at least one of vehicle propulsion (typically via a powertrain including an electric motor and/or internal combustion engine), braking, and steering are controlled at least partly by the computer 110 as opposed to a human operator. In a non-autonomous mode, i.e., a manual mode, the vehicle propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
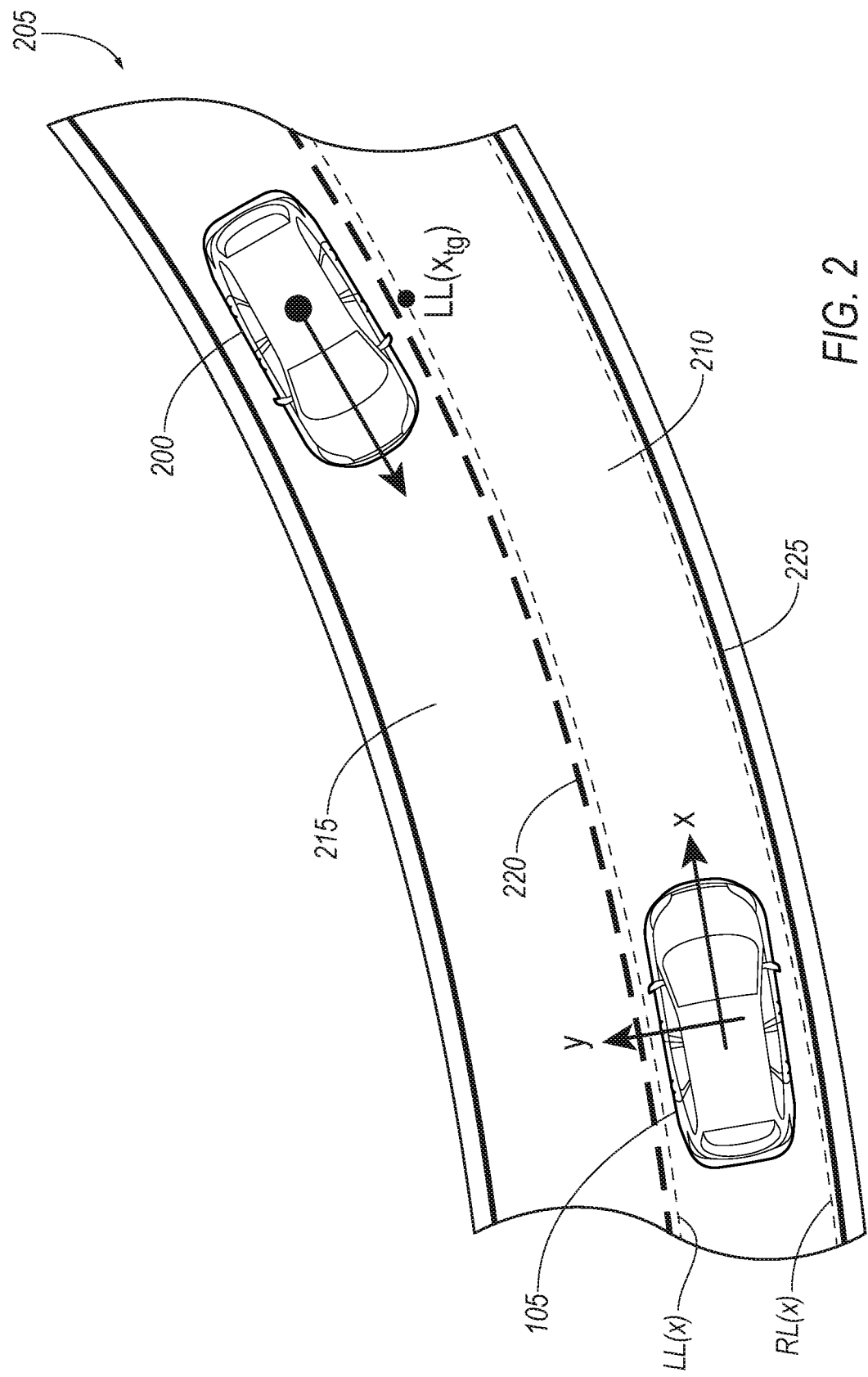
FIG. 2 is a top-down view of a roadway with the vehicle and a target vehicle.

FIG. 2 is a diagram of a host vehicle 105 and a target vehicle 200 on a roadway 205. The "target" vehicle 200 is a vehicle detected by the host vehicle 105. The roadway 205 includes a first roadway lane 210 and a second roadway lane 215. The first roadway lane 210 on which the host vehicle travels is a "host" roadway lane 210, and the second roadway lane 215 on which the target vehicle travels is a "target" roadway lane 215. The first roadway lane 210 has a left boundary line 220 and a right boundary line 225.

The computer 110 can generate a first virtual boundary and a second virtual boundary. In this context, a "virtual boundary" is a set of geo-coordinates representing a virtual line on a roadway 205. That is, the virtual boundary can be a virtual line on a map stored in the computer 110. For example, the first virtual boundary can represent a dividing line between the host roadway lane 210 and the target roadway lane 215, and the second virtual boundary can represent a dividing line between the host roadway lane 210 and a shoulder of the roadway 205.

The computer 110 can collect data about the target vehicle 200 to generate the virtual boundaries. The data can include a position of the target vehicle 200. A "position" of the target vehicle 200 is a set of coordinates $\hat{x}, \hat{y}$ defining a point in a global coordinate system, where $\hat{x}$ is a geo-coordinate defining a latitude and $\hat{y}$ is a geo-coordinate defining a longitude. The position of the target vehicle 200 is the geo-coordinates of a specified part of the target vehicle 200, e.g., a center of a front bumper, a center of a rear axle, etc., and can be specified as $\hat{x}_t, \hat{y}_t$.

The host vehicle 105 defines a vehicle coordinate system. The vehicle coordinate system defines points x, y, where x is a coordinate along a longitudinal axis of the host vehicle 105 and y is a coordinate along a lateral axis of the host vehicle 105. That is, x coordinates extend in a vehicle-forward and vehicle-rearward (i.e., longitudinal) direction, and y coordinates extend in a vehicle-crosswise (i.e., lateral) direction. The position of the target vehicle 200 in the vehicle coordinate system is $x_{tg}, y_{tg}$. That is, $x_{tg}$ is a "longitudinal position" that defines a "longitudinal distance" between the host vehicle 105 and the target vehicle 200, and $y_{tg}$ is a "lateral position" that defines a "lateral distance" between the host vehicle 105 and the target vehicle 200. The computer 110 can determine the position of the target vehicle 200 at a specific time t, i.e., the values $x_{tg}, y_{tg}$ are functions of time t: $x_{tg}(t), y_{tg}(t)$. The dependence on t may be omitted below for clarity, and $x_{tg}, y_{tg}$ are understood to be the position of the target vehicle 200 at the time t. The position of the target vehicle 200 as a function of time t over a time period t is a "predicted path" of the target vehicle 200.

The computer 110 can identify a plurality of data about the host vehicle 105 and the target vehicle 200. The data can include a heading angle θ' of the target vehicle 200, i.e., an angle defined between an axis extending along a center line of the target vehicle 200 and the longitudinal axis of the global coordinate system. The data can include a longitudinal velocity $v_{tg}$ of the target vehicle 200, i.e., the velocity along the longitudinal axis, and the longitudinal velocity $v_h$ of the host vehicle 105. The data can include a wheelbase L of the target vehicle 200, i.e., a distance between a center of a front wheel and a center of a rear wheel of the target vehicle 200. The data can include a width W of the target vehicle 200. The data can include a steering angle δ, i.e., an angle define between an axis extending through a center of a front wheel of the target vehicle 200 and the longitudinal axis. The data can include a longitudinal input u, i.e., an acceleration along the longitudinal axis caused by brake and/or throttle input. The computer 110 can receive the steering angle δ and the longitudinal input u from the target vehicle 200 as steering and propulsion data over the network 125, e.g., broadcast as a message.

The computer 110 can use one or more path polynomials to represent the left and right lane boundaries 220, 225 of the host roadway lane 210. A "path polynomial" is a predicted line represented as a polynomial equation of an upcoming distance x. In the present context, the "upcoming distance" x is a predetermined longitudinal distance in front of the host vehicle 105 from a front bumper of the host vehicle 105 at which the sensors 115 collect data and the path planning algorithm predicts the path. The upcoming distance x can be determined based on, e.g., a current speed of the host vehicle 105, a predetermined time threshold, determined based on empirical simulation data, a detection range of the sensors 115, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynominal by limiting the rates of longitudinal and lateral accelerations required to pilot a vehicle along the host vehicle path polynomial, where braking torque and powertrain torque are applied as positive and negative longitudinal accelerations and clockwise and counter clockwise steering torque are applied as left and right lateral accelerations.

The path polynomial can represent any line that the computer 110 may use for operating the vehicle 105, e.g., a lane boundary, a predicted path of the host vehicle 105, a predicted path of the target vehicle 200, etc. The computer 110 can use a path polynomial to predict a lane boundary such as the left lane boundary 220 and/or the right lane boundary 225. Additionally, the computer 110 can use a path polynomial to predict a path that the host vehicle 105 will follow. The path polynomials that predict the lane boundaries 220, 225 can use different data and have different coefficients than a path polynomial that predicts a path that the host vehicle 105 will follow. For example, the path polynomials for the lane boundaries 220, 225 can use data from the roadway lanes 210, 215, and the path polynomials for the path of the host vehicle 105 can use data from one or more components 120, e.g., speed, steering angle, acceleration, etc. That is, the computer 110 can use a path polynomial that predicts a path of the host vehicle 105 to determine whether the predicted path of the host vehicle 105 crosses one of the path polynomials for the lane boundaries 220, 225.

The computer 110 can define equations LL(x), RL(x) to predict respective left and right lane boundary lines 220, 225 of the host roadway lane 210. The equations LL(x), RL(x) can be defined for coordinates x, y as path polynomials from a path planning algorithm:

$$LL(x) = a_0 + a_1 x + a_2 x^2 + a_3 x^3 \quad (1)$$

$$RL(x) = b_0 + b_1 x + b_2 x^2 + b_3 x^3 \quad (2)$$

where $a_0$, $b_0$ are lateral offsets, i.e., predicted lateral distances between the path and a center line of the host vehicle 105 at an upcoming distance x, $a_1$, $b_1$ is a heading angle of the path, $a_2$, $b_2$ is the curvature of the path, and $a_3$, $b_3$ is the curvature rate of the path. The computer 110 can determine a lateral offset error $e_1$ and a heading offset error $e_2$. The lateral offset error $e_1$ is a lateral distance between the current location of the host vehicle 105 and a planned path of the host vehicle 105. The heading offset error $e_2$ is a difference between a current heading angle $\theta$ and a planned heading angle $\theta$. The computer 110 can use the errors $e_1$, $e_2$ to determine one or more constraint values c, as described below.

The computer 110 can define the virtual boundaries according to equations $h_1$, $h_2$ based on the equations LL(x), RL(x) and the predicted path $x_{tg}$ (t), $y_{tg}$ (t) of the target vehicle 200:

$$h_1(x, y, t) = y_{tg}(t) - LL(x_{tg}(t)) - \frac{W}{2} \quad (3)$$

$$h_2(x, y, t) = LL(0) - \frac{W}{2} \quad (4)$$

The computer 110 can define equations $\dot{h}_1$, $\dot{h}_2$ to define a boundary approach velocity of the target vehicle 200 to the first virtual boundary and a boundary approach velocity of the host vehicle 105 to the second virtual boundary. The equations take a set of variables $X = [x, y, \delta, v]$ and a second set of variables $U = [\delta, u]$ as input.

$$\dot{X} = f(X) + g(X)U \quad (5)$$

$$\dot{h}_1 = L_f h_1 = \frac{\partial h_1}{\partial X} f(X) \quad (6)$$

$$\dot{h}_2 = L_f h_2 = \frac{\partial h_2}{\partial X} f(X) \quad (7)$$

where the functions describing X are defined as:

$$f(X) = \begin{bmatrix} v\cos(\theta) \\ v\sin(\theta) \\ 0 \\ 0 \end{bmatrix} \quad (8)$$

$$g(X) = \begin{bmatrix} 0 & 0 \\ 0 & 0 \\ \frac{v_{tg}}{L} & 0 \\ 0 & G \end{bmatrix} \quad (9)$$

where G is the acceleration due to gravity. The equations represent a simplified bicycle model for a vehicle, such as the host vehicle 101 or the target vehicle 200. For the example shown in FIG. 2, the equations can define the boundary approach velocities:

$$\dot{h}_1 = v_{tg} e_2(x_{tg}) \quad (10)$$

$$\dot{h}_2 = v_h e_2(0) \quad (11)$$

The computer 110 can define equations $\ddot{h}_1$, $\ddot{h}_2$ to define a boundary approach acceleration of the target vehicle 200 to the first virtual boundary and a boundary approach acceleration of the host vehicle 105 to the second virtual boundary:

$$\ddot{h}_1 = L_g L_f h_1 \cdot U + L_f^2 h_1 = \frac{\partial (L_f h_1)}{\partial X} g(X) \cdot U + \frac{\partial (L_f h_1)}{\partial X} f(X) \quad (12)$$

$$\ddot{h}_2 = L_g L_f h_2 \cdot U + L_f^2 h_2 = \frac{\partial (L_f h_2)}{\partial X} g(X) \cdot U + \frac{\partial (L_f h_2)}{\partial X} f(X) \quad (13)$$

and the equations can define the boundary approach accelerations:

$$\ddot{h}_1 = \left[\frac{v_{tg}^2}{L} e_2(x_{tg})\right]\begin{bmatrix} \delta \\ u \end{bmatrix} + v_{tg} \dot{\psi}_r \quad (14)$$

$$\ddot{h}_2 = \left[\frac{v_h^2}{L} e_2(0)\right]\begin{bmatrix} \delta \\ u \end{bmatrix} + v_h \dot{\psi}_r \quad (15)$$

where $\dot{\psi}^r$ is a heading change of the roadway 205 at the current location of the host vehicle 105, defined by $\dot{\psi}_r = v_h k$, where k is a curvature of the roadway 205 at the current location of the host vehicle 105. Thus, the computer 110 can determine the boundary approach accelerations $\ddot{h}_1$, $\ddot{h}_2$ based on respective steering input, brake input, and throttle input to the host vehicle 105 and the target vehicle 200.

The computer 110 can identify a plurality of constraint values c. A "constraint value" c is a value based on one of the virtual boundaries, the boundary approach velocity, and the boundary approach acceleration that indicates motion of the target vehicle 200 to the virtual boundaries. The computer 110 can compare the constraint value c to a predetermined threshold, as described below, to identify a maneuver of the target 200. The computer 110 can define equations to determine two constraint values $c_1$, $c_2$ based on the virtual boundary equations:

$$c_1(X) = \ddot{h}_1(X) + l_1 \dot{h}_1(X) + l_0 h_1(X) \quad (16)$$

$$c_2(X) = \ddot{h}_2(X) + l_1 \dot{h}_2(X) + l_0 h_2(X) \quad (17)$$

where $l_0$, $l_1$ are predetermined scalar values that provide real, positive eigenvalues to the equations $c_1(X) \geq 0$, $c_2(X) \geq 0$. Thus, the first constraint value $c_1$ is based on the boundary approach velocity $\dot{h}_1$ of the target vehicle 200 and a boundary approach acceleration $\ddot{h}_1$ of the target vehicle 200. The second constraint value $c_2$ is based on the boundary approach velocity $\dot{h}_2$ of the host vehicle 105 and a boundary approach acceleration $\ddot{h}_2$ of the host vehicle 105. Alternatively, when acceleration data of the target vehicle 200 or the host vehicle 105 is unavailable, the first and second constraint values $c_1$ $c_2$ can be determined based on the boundary approach speeds $\dot{h}_1$, $\dot{h}_2$:

$$c_1(X) = \dot{h}_1(X) + l_0 h_1(X) \quad (18)$$

$$c_2(X) = \dot{h}_2(X) + l_0 h_2(X) \quad (19)$$

The computer 110 can determine whether one of the constraint values $c_1$ $c_2$ violates a threshold. In this context, a threshold is "violated" if the constraint value c is outside a range of values limited or defined by the threshold. For example, the threshold can be violated when the constraint value c falls below the threshold. Alternatively, the threshold can be violated when the constraint value c exceeds the threshold. In the example of FIG. 2, the threshold can be 0, and the computer 110 can perform the threat assessment when $c_1 < 0$ and/or $c_2 < 0$. The computer 110 can thus determine that the constraint values $c_1$ $c_2$ violate their respective thresholds based on a sign of the constraint values $c_1$, $c_2$, the "sign" being positive if the value exceeds 0, negative if the value is below 0, and 0 if the value equals 0. That is, if at least one of $c_1$ $c_2$ is negative, then at least one of the thresholds is violated. Alternatively or additionally, the computer 110 can determine that at least one of the constraint values $c_1$ $c_2$ is violated when at least one of the host vehicle 105 and/or the target vehicle 200 crosses one of the virtual boundaries 210, 215.

When one of the first and/or second constraint values violates their respective threshold, the computer 110 can perform a threat assessment of a collision between the host vehicle 105 and the target vehicle 200. Alternatively or additionally, the computer can perform the threat assessment upon detecting the target vehicle in the host roadway lane 210. A "threat assessment" is a determination of a probability of a collision between the host vehicle 105 and the target vehicle 200. For example, the threat assessment can be an amount of longitudinal deceleration required to stop the host vehicle 105 before reaching the target vehicle 200. In another example, the threat assessment can be an amount of lateral acceleration to steer the host vehicle 105 away from the target vehicle 200. In another example, the threat assessment can be an amount of longitudinal acceleration required to move the host vehicle 105 past the target vehicle 200. The computer 110 can compare the threat assessment to a predetermined threshold. For example, if the threat assessment is an amount of longitudinal deceleration required to stop the host vehicle 105, the computer 110 can detect the threat when the required amount of longitudinal deceleration is greater than a predetermined threshold, e.g., 50% of the maximum deceleration that a brake 120 can provide to the host vehicle 105. The predetermined threshold can be determined based on, e.g., empirical and/or virtual testing of host vehicles 105 and target vehicles 200 on test tracks, specific operation limits of physical components 120, manufacturer recommendations, etc. For example, the testing can include identifying paths of a plurality of virtual vehicles 105, 200 in a plurality of intersections operating at specified speeds, longitudinal accelerations, and lateral accelerations. The testing can identify a maximum speed, a maximum longitudinal acceleration, and/or a maximum lateral acceleration to avoid a collision between the virtual host vehicle 105 and the virtual target vehicle 200. The threshold can be based on the maximum speed and/or accelerations resulting from the testing. The predetermined threshold can be the minimum threat assessment value determined, from the empirical and/or virtual testing, to prevent a collision between the host vehicle 105 and the target vehicle 200.

The computer 110 can actuate one or more vehicle components to avoid the target vehicle bases on the threat assessment. The computer 110 can adjust a path that the host vehicle 105 follows (e.g., a path produced from a path polynomial described above) to avoid the target vehicle 200. Adjusting the path can include, e.g., determining a steering angle, determining a throttle input, determining a brake input, etc., such that the host vehicle 105 avoids the target vehicle 200 upon attaining the steering angle and throttle and/or brake input to follow the adjusted path. For example, the computer 110 can actuate a steering motor 120 to provide the lateral acceleration to steer the host vehicle 105 away from the target vehicle 200. In another example, the computer 110 can actuate a propulsion 120 to accelerate the host vehicle 105 past the target vehicle 200. In another example, the computer 110 can actuate a brake 120 to slow or stop the host vehicle 105 until the target vehicle 200 passes the host vehicle 105.

The computer 110 can determine a threat assessment constraint value $c_3$. When the threat assessment constraint value $c_3$ violates a threshold, the computer 110 can perform the threat assessment. The threat assessment constraint value $c_3$ can be determined based on a function $h_3$ of the position $x_{tg}$, $y_{tg}$ of the target vehicle 200:

$$h_3(t) = (x - x_{tg})^2 + (y - y_{tg})^2 - r_{min}^2 \quad (20)$$

$$\dot{h}_3(t) = \quad (21)$$
$$2(x - x_{tg})(v_h \cos(\theta) - v_{tg}\cos(\theta_{tg})) + 2(y - y_{tg})(v_h \sin(\theta) - v_{tg}\sin(\theta_{tg}))$$

$$\ddot{h}_3(t) = L_f^2 h_3 + L_g L_f h_3 \begin{bmatrix} \delta \\ u \\ \delta_{tg} \\ u_{tg} \end{bmatrix} \quad (22)$$

$$L_f^2 h_3 = 2v_h^2 + 2v_{tg}^2 - 4v_h v_{tg}\cos(\theta - \theta_{tg}) \quad (23)$$

$$L_g L_f h_3 = \begin{bmatrix} 2\frac{v^2}{L}(-(x-x_{tg})\sin(\theta) + (y-y_{tg})\cos(\theta)) \\ 2g((x-x_{tg})\cos(\theta) + (y-y_{tg})\sin(\theta)) \\ 2\frac{v^2}{L}((x-x_{tg})\sin(\theta_{tg}) - (y-y_{tg})\cos(\theta_{tg})) \\ -2g((x-x_t)\cos(\theta_{tg}) + (y-y_t)\sin(\theta_{tg})) \end{bmatrix}^T \quad (24)$$

$$c_3(X) = \ddot{h}_3(X) + l_1 \dot{h}_3(X) + l_0 h_3(X) \quad (25)$$

where $r_{min}$ is a predetermined minimum distance that the host vehicle 105 should remain from the target vehicle 200. The value for $r_{min}$ can be determined by, e.g., a manufacturer. Thus, the constraint value $c_3$ is based on the lateral distance and the longitudinal distance between the host vehicle 105 and the target vehicle 200, as shown in the $h_3$ term, and the lateral acceleration and the longitudinal acceleration between the host vehicle 105 and the target vehicle 200, as shown in the $\ddot{h}_3$ term.

Figure 3:
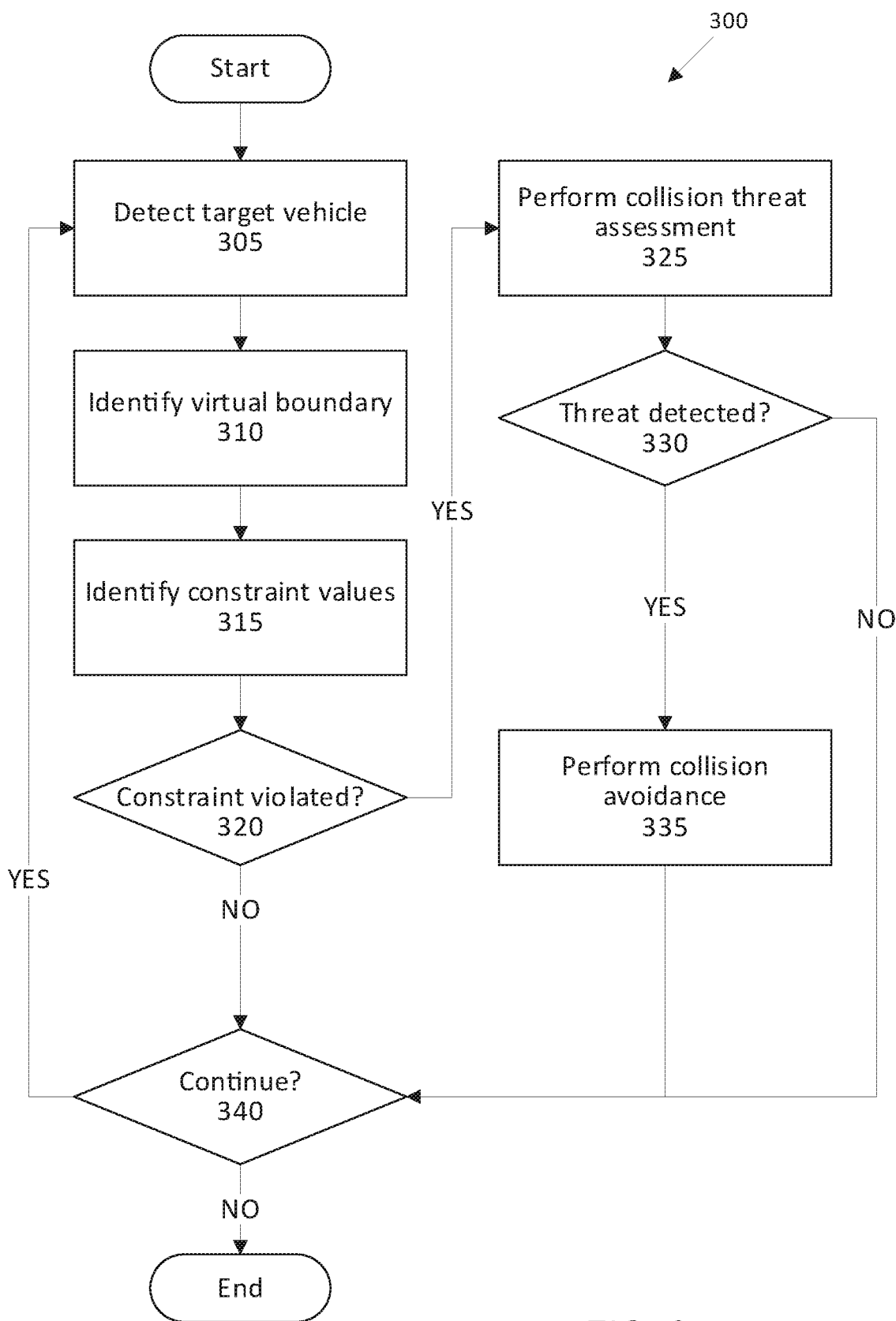
FIG. 3 is a diagram of an example process for operating the vehicle.

FIG. 3 is a diagram of an example process 300 for operating a host vehicle 105. The process 300 begins in a block 305, in which a computer 110 of the host vehicle 105 detects a target vehicle 200. The computer 110 can detect the target vehicle 200 based on data from one or more sensors 115. For example, the computer 110 can actuate a camera to collect images of the environment around the host vehicle 105 and can use a conventional image processing technique (e.g., Canny edge detection, deep learning object detection, etc.) to identify the target vehicle 200. In another example, the computer 110 can actuate a lidar to collect a data point cloud and can use a conventional object detection algorithm (e.g., segmentation) to identify the target vehicle 200.

Next, in a block 310, the computer identifies a first virtual boundary and a second virtual boundary. As described above, the computer 110 can use functions such as $h_1$, $h_2$ to identify the virtual boundaries between the host vehicle 105 and the target vehicle 200. The virtual boundaries allow the computer 110 to predict movement of the host vehicle 105 and one or more target vehicles 200 on the roadway 205.

Next, in a block 315, the computer 110 identifies one or more constraint values c. As described above, the constraint values c are values based on the virtual boundaries, a boundary approach velocity, and a boundary approach acceleration indicating motion of the target vehicle 200 and the host vehicle 105 to the virtual boundaries. For example, a constraint value $c_1$ can be an output of one of the virtual boundary equations described above. The computer 110 can determine a first constraint value $c_1$ and a second constraint value $c_2$.

Next, in a block 320, the computer 110 determines whether one of the constraint values c violates a respective threshold. For example, the computer 110 can determine whether the first constraint value violates a first threshold, e.g., $c_1<0$. The first threshold can be determined based on, e.g., virtual testing of virtual host vehicles 105 and virtual target vehicles 200 on virtual roadways 205. The computer 110 can determine whether the second constraint value violates a second threshold, e.g., $c_2<0$. If at least one of the constraint values $c_2$ violates a respective threshold, the process 300 continues in a block 325. Otherwise, the process 300 continues in a block 340.

In the block 325, the computer 110 performs a threat assessment of a collision between the host vehicle 105 and the target vehicle 200. As described above, the threat assessment is a determination of a probability of a collision between the host vehicle 105 and the target vehicle 200. For example, the threat assessment can be an amount of longitudinal deceleration required to stop the host vehicle 105 before reaching the target vehicle 200. In another example, the threat assessment can be an amount of lateral acceleration to steer the host vehicle 105 away from the target vehicle 200. In another example, the threat assessment can be an amount of longitudinal acceleration required to move the host vehicle 105 past the target vehicle 200.

Next, in a block 330, the computer 110 determines whether a threat is detected. The computer 110 can compare the threat assessment to a predetermined threshold, as described above. For example, if the threat assessment is an amount of longitudinal deceleration required to stop the host vehicle 105, the computer 110 can detect the threat when the required amount of longitudinal deceleration is greater than a predetermined threshold, e.g., 50% of the maximum deceleration that a brake 120 can provide to the host vehicle 105. The predetermined threshold can be determined based on, e.g., empirical and/or virtual testing of host vehicles 105 and target vehicles 200 on test tracks, specific operation limits of physical components 120, manufacturer recommendations, etc. The predetermined threshold can be the minimum threat assessment value determined, from the empirical and/or virtual testing, to prevent a collision between the host vehicle 105 and the target vehicle 200. For example, the testing can include identifying paths of a plurality of virtual vehicles 105, 200 in a plurality of intersections operating at specified speeds, longitudinal accelerations, and lateral accelerations. The testing can identify a maximum speed, a maximum longitudinal acceleration, and/or a maximum lateral acceleration to avoid a collision between the virtual host vehicle 105 and the virtual target vehicle 200. The threshold can be based on the maximum speed and/or accelerations resulting from the testing. When the threat assessment violates the threshold, the computer can determine that a threat of a collision is detected. If the computer 110 detects a threat, the process 300 continues in a block 335. Otherwise, the process 300 continues in the block 340.

In the block 335, the computer 110 actuates one or more components 120 to avoid the target vehicle 200. The computer 110 can adjust a path for the host vehicle 105 (e.g., a path produced from a path polynomial described above) to avoid the target vehicle 200. Adjusting the path can include, e.g., determining a steering angle, determining a throttle input, determining a brake input, etc., such that the host vehicle 105 avoids the target vehicle 200 upon attaining the steering angle and throttle and/or brake input to follow the adjusted path. For example, the computer 110 can actuate a steering motor 120 to provide the lateral acceleration to steer the host vehicle 105 away from the target vehicle 200. In another example, the computer 110 can actuate a propulsion 120 to accelerate the host vehicle 105 past the target vehicle 200. In another example, the computer 110 can actuate a brake 120 to slow or stop the host vehicle 105 until the target vehicle 200 passes the host vehicle 105. Alternatively or additionally, the computer 110 can actuate all three of the steering motor 120, the propulsion 120, and the brake 120 to move the host vehicle 105 to avoid the target vehicle 200.

In the block 340, the computer 110 determines whether to continue the process 300. For example, the computer 110 can determine not to continue the process 300 when the target vehicle 200 passes the host vehicle 105. If the computer 110 determines to continue, the process 300 returns to the block 305. Otherwise, the process 300 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

The invention claimed is:

1. A system, comprising a computer including a processor and a memory, the memory storing instructions executable by the processor to:
   identify a virtual boundary between a host roadway lane of a host vehicle and a target roadway lane of a target vehicle, the virtual boundary based on a predicted path of the target vehicle;
   determine a first constraint value based on a boundary approach velocity of the target vehicle;
   determine a second constraint value based on (1) a boundary approach velocity of the host vehicle, (2) a boundary approach acceleration of the host vehicle, and (3) a predicted lateral distance from the target vehicle to the virtual boundary; and
   perform a threat assessment of a collision between the host vehicle and the target vehicle upon determining that the first constraint value violates a first threshold or the second constraint value violates a second threshold.

2. The system of claim 1, wherein the instructions further include instructions to actuate one or more vehicle components to avoid the target vehicle based on the threat assessment.

3. The system of claim 1, wherein the instructions further include instructions to, upon performing the threat assessment, identify a third constraint value based on a location of the target vehicle and to actuate one or more components when the third constraint value violates a third threshold.

4. The system of claim 1, wherein the instructions further include instructions to input the lateral position of the target vehicle to a path planning algorithm to predict the lateral distance.

5. The system of claim 1, wherein the instructions further include instructions to determine that the first constraint value violates the first threshold based on a sign of the first constraint value.

6. The system of claim 1, wherein the instructions further include instructions to determine that the second constraint value violates the second threshold when the target vehicle crosses the virtual boundary.

7. The system of claim 1, wherein the instructions further include instructions to determine the second constraint value on a boundary approach acceleration of the target vehicle.

8. The system of claim 1, wherein the instructions further include instructions to determine the boundary approach acceleration of the host vehicle based on a steering input, a brake input, and a throttle input to the host vehicle.

9. The system of claim 1, wherein the instructions further include instructions to perform the threat assessment upon predicting that the target vehicle will cross the virtual boundary and move into the host roadway lane.

10. A method, comprising:
    identifying a virtual boundary between a host roadway lane of a host vehicle and a target roadway lane of a target vehicle, the virtual boundary based on a predicted path of the target vehicle;
    determining a first constraint value based on a boundary approach velocity of the target vehicle;
    determining a second constraint value based on (1) a boundary approach velocity of the host vehicle, and (2) a boundary approach acceleration of the host vehicle, and (3) a predicted lateral distance from the target vehicle to the virtual boundary; and
    performing a threat assessment of a collision between the host vehicle and the target vehicle upon determining that the first constraint value violates a first threshold or the second constraint value violates a second threshold.

11. The method of claim 10, further comprising actuating one or more vehicle components to avoid the target vehicle based on the threat assessment.

12. The method of claim 10, further comprising, upon performing the threat assessment, identifying a third constraint value based on a location of the target vehicle and actuating one or more components when the third constraint value violates a third threshold.

13. The method of claim 10, further comprising determining the boundary approach acceleration of the host vehicle based on a steering input, a brake input, and a throttle input to the host vehicle.

14. A system, comprising a computer including a processor and a memory, the memory storing instructions executable by the processor to:
   identify a virtual boundary between a host roadway lane of a host vehicle and a target roadway lane of a target vehicle, the virtual boundary based on a predicted path of the target vehicle;
   determine a first constraint value based on a boundary approach velocity of the target vehicle;
   determine a second constraint value based on (1) a boundary approach velocity of the host vehicle, and (2) a boundary approach acceleration of the host vehicle; and
   perform a threat assessment of a collision between the host vehicle and the target vehicle upon determining that the first constraint value violates a first threshold or, when the target vehicle crosses the virtual boundary, that the second constraint value violates a second threshold.

15. The system of claim 14, wherein the instructions further include instructions to actuate one or more vehicle components to avoid the target vehicle based on the threat assessment.

16. A system, comprising a computer including a processor and a memory, the memory storing instructions executable by the processor to:
   identify a virtual boundary between a host roadway lane of a host vehicle and a target roadway lane of a target vehicle, the virtual boundary based on a predicted path of the target vehicle;
   determine a first constraint value based on a boundary approach velocity of the target vehicle;
   determine a second constraint value based on (1) a boundary approach velocity of the host vehicle, (2) a boundary approach acceleration of the host vehicle, and (3) a boundary approach acceleration of the target vehicle; and
   perform a threat assessment of a collision between the host vehicle and the target vehicle upon determining that the first constraint value violates a first threshold or the second constraint value violates a second threshold.

17. The system of claim 16, wherein the instructions further include instructions to actuate one or more vehicle components to avoid the target vehicle based on the threat assessment.

18. A system, comprising a computer including a processor and a memory, the memory storing instructions executable by the processor to:
   identify a virtual boundary between a host roadway lane of a host vehicle and a target roadway lane of a target vehicle, the virtual boundary based on a predicted path of the target vehicle;
   determine a first constraint value based on a boundary approach velocity of the target vehicle;
   determine a second constraint value based on (1) a boundary approach velocity of the host vehicle, and (2) a boundary approach acceleration of the host vehicle determined based on a steering input, a brake input, and a throttle input to the host vehicle; and
   perform a threat assessment of a collision between the host vehicle and the target vehicle upon determining that the first constraint value violates a first threshold or the second constraint value violates a second threshold.

19. The system of claim 18, wherein the instructions further include instructions to actuate one or more vehicle components to avoid the target vehicle based on the threat assessment.

* * * * *